US009363256B2

(12) United States Patent
Caldwell (10) Patent No.: US 9,363,256 B2
(45) Date of Patent: Jun. 7, 2016

(54) USER AUTHENTICATION IN SEPARATE AUTHENTICATION CHANNELS

(71) Applicant: MX Technologies, Inc., Lehi, UT (US)

(72) Inventor: John Ryan Caldwell, Lehi, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 14/885,829

(22) Filed: Oct. 16, 2015

(65) Prior Publication Data

US 2016/0036801 A1 Feb. 4, 2016

Related U.S. Application Data

(63) Continuation-in-part of application No. 13/986,228, filed on Apr. 11, 2013.

(51) Int. Cl.
| | |
|---|---|
| *G06F 21/00* | (2013.01) |
| *H04L 29/06* | (2006.01) |
| *G06Q 20/32* | (2012.01) |
| *G06Q 20/42* | (2012.01) |
| *H04L 9/32* | (2006.01) |

(52) U.S. Cl.
CPC .............. *H04L 63/08* (2013.01); *G06Q 20/322* (2013.01); *G06Q 20/425* (2013.01); *H04L 9/3215* (2013.01); *H04L 9/3226* (2013.01); *H04L 63/102* (2013.01); *H04L 63/18* (2013.01); *H04L 2209/56* (2013.01)

(58) Field of Classification Search
USPC ............ 705/16, 21, 59, 71; 380/44, 262, 278, 380/279
See application file for complete search history.

(56) References Cited

U.S. PATENT DOCUMENTS

| | | | |
|---|---|---|---|
| 7,900,247 | B2 | 3/2011 | Chong |
| 8,006,291 | B2 | 8/2011 | Headley et al. |
| 8,671,444 | B2 | 3/2014 | Kulkarni et al. |
| 8,934,865 | B2 | 1/2015 | Nandagopal |
| 2002/0164026 | A1 | 11/2002 | Huima |
| 2006/0015358 | A1* | 1/2006 | Chua ...................... G06Q 20/02 705/44 |
| 2008/0034216 | A1 | 2/2008 | Law |
| 2014/0310173 | A1 | 10/2014 | Caldwell |

* cited by examiner

*Primary Examiner* — Dante Ravetti
(74) *Attorney, Agent, or Firm* — Kunzler Law Group, PC (57) ABSTRACT

Apparatuses, systems, methods, and computer program products are disclosed for user authentication in separate authentication channels. A token module is configured to create a unique token in response to receiving user credentials from an unknown user for a secure interface of a third party system. An identity module is configured to log into the secure interface using the received user credentials, and submit the unique token to a private input element located behind the secure interface. A match module is configured to receive the unique token from the private input element and a user identifier associated with the unknown user from the third party system. The match module is configured to associate the received user credentials with the user identifier based on the unique token. An access module is configured to display information associated with the user identifier to the unknown user.

20 Claims, 6 Drawing Sheets

USER AUTHENTICATION IN SEPARATE AUTHENTICATION CHANNELS

CROSS-REFERENCES TO RELATED APPLICATIONS

This is a continuation-in-part application of and claims priority to U.S. patent application Ser. No. 13/986,228 entitled "SYNCING TWO SEPARATE AUTHENTICATION CHANNELS TO THE SAME ACCOUNT OR DATA USING A TOKEN OR THE LIKE" and filed on Apr. 11, 2013, for Ryan Caldwell, which is incorporated herein by reference.

FIELD

This invention relates to information security and more particularly relates to authenticating an unknown user using separate authentication channels.

BACKGROUND

Some information systems for various organizations may allow a user to log into his/her user account using various devices, authentication channels, and/or applications, such as a web browser, a mobile application, or the like. However, some devices, authentication channels, and/or applications may not be compatible with a primary authentication protocol of an organization, or may be blocked or otherwise denied access to such an authentication protocol. If a user attempts to log into a system using an incompatible device, authentication channel, and/or application, the user's authentication may fail such that the user cannot log into his/her user account, or the user may be provided with data that is not in sync with the system due to lack of access.

SUMMARY

Apparatuses for user authentication in separate authentication channels are disclosed. A token module, in one embodiment, is configured to create a unique token in response to receiving user credentials from an unknown user for a secure interface of a third party system. An identity module, in some embodiments, is configured to log into the secure interface of the third party system using the received user credentials, and submit the unique token to a private input element located behind the secure interface of the third party system in response to successfully logging into the secure interface of the third party system using the received user credentials. A match module, in a further embodiment, is configured to receive the unique token from the private input element and a user identifier associated with the unknown user from the third party system. The match module, in one embodiment, is configured to associate the received user credentials with the user identifier based on the unique token. An access module, in various embodiments, is configured to display information associated with the user identifier to the unknown user in response to the match module associating the received user credentials with the user identifier.

An apparatus, in one embodiment, includes a semiconductor integrated circuit device. The semiconductor integrated circuit device, in some embodiments, includes one or more pins configured to receive user credentials from an unknown user for a secure interface of a third party system. The semiconductor integrated circuit device, in a further embodiment, includes one or more hardware circuits configured to create a unique token in response to receiving the user credentials. In some embodiments, the semiconductor integrated circuit device includes one or more hardware circuits configured to log into the secure interface of the third party system using the received user credentials and submit the unique token to a private input element located behind the secure interface of the third party system in response to successfully logging into the secure interface of the third party system using the received user credentials.

In one embodiment, the semiconductor integrated circuit device includes one or more pins configured to receive the unique token from the private input element and receive a user identifier associated with the unknown user from the third party system. In certain embodiments, the semiconductor integrated circuit device includes one or more hardware circuits configured to associate the received user credentials with the user identifier based on the unique token. In a further embodiment, the semiconductor integrated circuit device includes one or more hardware circuits configured to display information associated with the user identifier to the unknown user in response to associating the received user credentials with the user identifier.

Methods for user authentication in separate authentication channels are disclosed. A method, in one embodiment, includes creating a unique token in response to receiving user credentials from an unknown user for a secure interface of a third party system and logging into the secure interface of the third party system using the received user credentials. In a further embodiment, the method includes submitting the unique token to a private input element located behind the secure interface of the third party system in response to successfully logging into the secure interface of the third party system using the received user credentials.

In some embodiments, the method includes receiving the unique token from the private input element and receiving a user identifier associated with the unknown user from the third party system. In a further embodiment, the method includes associating the received user credentials with the user identifier based on the unique token. In certain embodiments, the method includes displaying information associated with the user identifier to the unknown user in response to associating the received user credentials with the user identifier.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
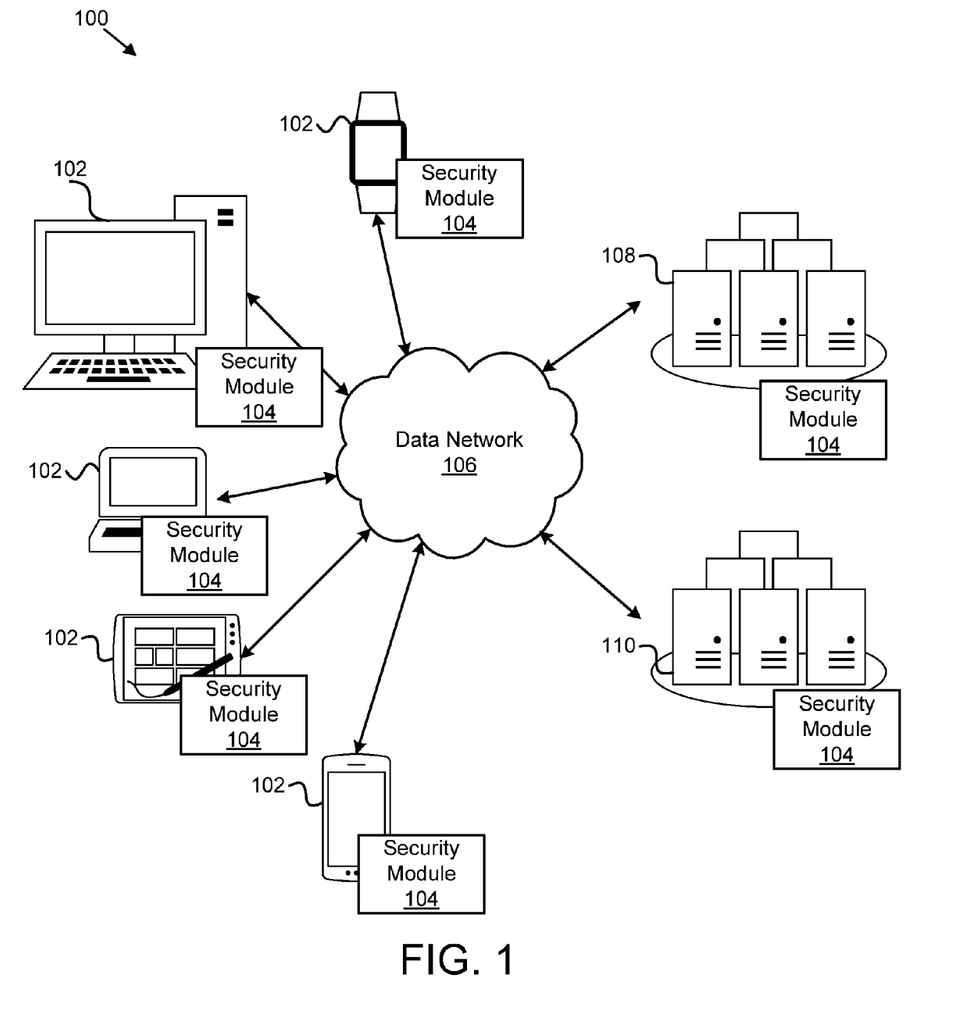
FIG. 1 is a schematic block diagram illustrating one embodiment of a system for user authentication in separate authentication channels.

FIG. 1 depicts one embodiment of a system 100 for user authentication in separate authentication channels. In one embodiment, the system 100 includes one or more information handling devices 102, one or more security modules 104, one or more data networks 106, one or more third party systems 108, and/or one or more backend systems 110. In certain embodiments, even though a specific number of information handling devices 102, security modules 104, data networks 106, third party systems 108, and backend systems 110 are depicted in FIG. 1, one of skill in the art will recognize, in light of this disclosure, that any number of information handling devices 102, security modules 104, data networks 106, third party systems 108, and backend systems 110 may be included in the system 100 for user authentication in separate authentication channels.

In one embodiment, the system 100 includes one or more information handling devices 102. The information handing devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to a third party system 108 and/or a backend system 110 via a data network 106, described below. The information handling devices 102, in a further embodiment, are capable of executing various programs, program code, applications, instructions, functions, or the like.

In one embodiment, a security module 104 is configured to create a unique token in response to receiving user credentials from an unknown user at an information handling device 102. A security module 104 (e.g., the same security module 104 that received the user credentials and/or a second instance or portion of the security module 104, executing on a backend system 110 or the like), in a further embodiment, is configured to log into a secure interface of a third party system 108, described below, using the received user credentials, and to submit the unique token to a private input element located behind the secure interface in response to successfully logging into the secure interface. A security module 104, in a further embodiment, receives the unique token from the private input element and a user identifier associated with the unknown user from the third party system 108, and associates the user credentials with the user identifier based on receiving and/or matching the unique token. A security module 104, in some embodiments, displays information associated with the user identifier to the unknown user in response to associating the received user credentials with the user identifier.

In this manner, the security module 104, which is described in more detail below, may authenticate an unknown user and match the unknown user to his/her user account and/or data by receiving the user's credentials via a first authentication channel (e.g., via a mobile application executing on a mobile device 102 or the like) and validating the user's credentials via a second authentication channel (e.g., an online authorization system of a third party 108 where the unknown user may have a known user account and user data). For example, in certain embodiments, the security module 104 may enable an application or service (e.g, a security module 104 executing on a user device 102 and/or a security module 104 executing on a backend system 110) without access to and/or an affiliation with a secure third party system 108, to synchronize and/or provide user data, such as settings, preferences, user provided content, or the like, from the secure third party system 108 to an unknown user in a secure manner, providing consistency between the third party system 108's own user data (e.g., provided in an online portal and/or application from the third party system 108) and user data provided by the security module 104.

In various embodiments, the security module 104 may be embodied as hardware, software, or some combination of hardware and software. In one embodiment, the security module 104 may comprise executable program code stored on a non-transitory computer readable storage medium for execution on a processor of an information handling device 102, a device of the third party system 108, the backend system 110, or the like. For example, the security module 104 may be embodied as executable program code executing on one or more of an information handling device 102, a third party system 108, a backend system 110, a combination of one or more of the foregoing, or the like. In such an embodiment, the various modules that perform the operations of the security module 104, as described below, may be located on an information handling device 102, a backend system 110, a combination of the two, and/or the like.

In various embodiments, the security module 104 may be embodied as a hardware appliance that can be installed or deployed in a third party system 108, a backend system 110, on a user's information handling device 102, or elsewhere on the data network 106. In certain embodiments, the security module 104 may comprise a hardware device such as a secure hardware dongle or other hardware appliance device (e.g., a set-top box, a network appliance, or the like) that attaches to another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like). A hardware appliance of the security module 104 may comprise a power interface, a wired and/or wireless network interface, a graphical interface that attaches to a display, and/or a semiconductor integrated circuit device as described below, configured to perform the functions described herein with regard to the security module 104.

The security module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the security module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security module 104.

The semiconductor integrated circuit device or other hardware appliance of the security module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the security module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The third party system 108, in one embodiment, includes a network accessible computing system such as one or more web servers hosting one or more web sites, an enterprise intranet system, an application server, an application programming interface (API) server, an authentication server, or the like. The third party system 108 may include systems related to various institutions or organizations. For example, the third party system 108 may include a system providing electronic access to a financial institution, a university, a government agency, a utility company, an email provider, or the like. A third party system 108 may allow users to create user accounts to view, create, and/or modify data related to the user's account (e.g., settings, preferences, user provided/uploaded data, a transaction history, account information, customized data, or the like). Accordingly, a third party system 108 may include an authorization channel, such as a login element or page of a web site, application, or similar frontend, where a user can provide credentials, such as a username/password combination, to view his/her user account data.

In one embodiment, the backend system 110 facilitates the authorization of an unknown user using a first authentication channel via a second authentication channel (e.g., an authentication channel of a third party system 108). The backend system 110 may include one or more servers located remotely to the information handling devices 102 and the third party systems 108. The backend system 110 may include at least a portion of the modules of the security module 104, may comprise hardware of the security module 104, may store executable program code of the security module 104 in one or more non-transitory computer readable storage media, and/or may otherwise perform one or more of the various operations of the security module 104 described herein in order to authenticate and match an unknown user to his/her user data via a secure third party system 108.

Figure 2:
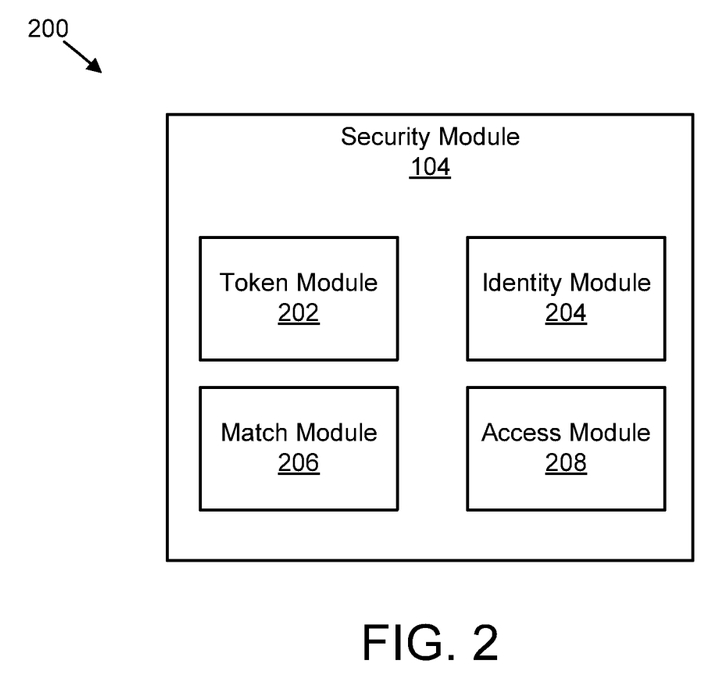
FIG. 2 is a schematic block diagram illustrating one embodiment of a module for user authentication in separate authentication channels.

FIG. 2 depicts one embodiment of a module 200 for user authentication in separate authentication channels. In one embodiment, the module 200 includes an embodiment of a security module 104. The security module 104, in certain embodiments, includes one or more of a token module 202, an identity module 204, a match module 206, and an access module 208, which are described in more detail below.

The token module 202, in one embodiment, creates a unique token or identifier in response to receiving user credentials from an unknown user for a secure interface of a third party system 108. In one embodiment, the token module 202 receives the user credentials from an information handling device 102 associated with the user. In certain embodiments, the token module 202 receives the user credentials from an application executing on the information handling device 102. For example, the token module 202 may receive a username and password combination entered by a user into an application executing on the user's smart phone 102 (e.g., a banking application, a personal financial management or budgeting application, a shopping application, an educational or e-learning application, an entertainment application, a gaming application, or other application secured by a username and password or other secure credentials). In addition to a username and password combination, other credentials may include a personal identification number, a passphrase, a code, biometric data (e.g., fingerprint data, voice data, retinal data, or the like), data associated with a trusted or authenticated device (e.g., an IP address, a MAC address, a device identifier, or the like associated with an information handling device 102 that the token module 202 knows and trusts).

In certain embodiments, the user credentials are intended for and/or associated with a secure interface of a third party system 108. For example, at least a portion of the security module 104 may comprise a user application and/or website allowing a user to access data and/or services of the third party system 108. As described above, the third party system 108 may include enterprise systems, database systems, or the like, for various institutions, companies, universities, organizations, or the like. For example, the user may enter his/her credentials in a mobile application associated with their insurance company to view or edit his/her insurance account information, may enter his/her credentials in a mobile application associated with a bank or other financial institution to view or edit his/her transaction information or budgets, or the like. The user credentials in such an embodiment may be the same for the mobile application as for a different authentication channel for the insurance company, bank, or other entity, such as a web site interface of the third party system 108.

The token module 202, in some embodiments, generates a unique token in response to receiving the user credentials. The unique token, in certain embodiments, includes a random string of characters of various lengths, an image, a sound, an event trigger or a series of event triggers (e.g., a mouse click event, a key press event, a hover event, or the like), a code snippet, a script (e.g., a set of JavaScript instructions), selecting a predefined input element of a web page (e.g., a button or link), selecting or hovering over a predefined section of a web page (e.g., one or more predefined areas, elements, or pixels) with a cursor, or the like. For example, the unique token may comprise a predefined sequence of event triggers like "a left-button click, a 'z'-key press, and a right-button click," which may be performed (e.g., generated within code) by the identity module 204, below, on a predefined web page to "submit" the token.

In one embodiment, the token module 202 creates the unique token based on the received credentials. For instance, the token module 202 may use at least a portion of the user credentials to seed a random number generator, as input into a hash function to generate a hash value, or the like, to generate the unique token. For example, the token module 202 may receive fingerprint data entered by the user to seed a random number generator. Alternatively, the token module 202 may generate a random string of characters, numbers symbols, or the like for the unique token. The unique token may be globally unique (e.g., a globally unique identifier (GUID)), may be unique among active or in-use tokens (e.g., the token module 202 may reuse a token after it has been used to match a user's credentials), or the like. One of skill in the art will recognize, in light of this disclosure, the various methods for creating a unique token.

An unknown user, as used herein, may be a user that has an account, or is otherwise associated with, the institution associated with the third party system 108, but for which the security module 104 does not recognize the associated username or other credentials (e.g., has not previously received and/or matched the credentials for the unknown user). The user may be able to log in to the third party system 108 using a first authentication channel, such as a web site interface or application of the third party system 108 to view their account information, including, but not limited to, preferences, settings, reports, personal information, contact information, account status, and/or the like. However, when an unknown user attempts to log in via a second authentication channel (e.g., the security module 104), such as a mobile application executing on a mobile device 102, the user may be "unknown" in the sense that the mobile application 104 or other security module 104 or portion thereof may not initially recognize the user and may first determine whether the user who provided the credentials to the second authentication channel is the same user who previously logged in to the third party system 108 via the first authentication channel.

The identity module 204, in one embodiment, logs into a secure interface of a third party system 108 using the received credentials from an unknown user. In certain embodiments, the identity module 204, by logging into the third party system 108 using the received credentials, verifies that a user account associated with the user credentials exists. For instance, the identity module 204 may provide a username and password to the third party system 108, and the third party system 108 may respond with a confirmation that a user account exists for the provided credentials or a message that the log in failed.

In one example, the user may provide a username and password to a banking mobile application executing on an information handling device 102 (e.g., a frontend security module 104). The identity module 204 (e.g., from the backend system 110 or other backend security module 104) may take the received username and password and provide them to a login page for the third party system 108 (e.g., a bank or other entity) to attempt to log the user into their account associated with the third party system 108. If the login is successful, the identity module 204 can confirm that the user is a registered or valid user; otherwise, if the login fails, the identity module 204 determines that the credentials are bad, that the user is not a registered user, or the like. The identity module 204 may use a command line interface, such as wget or the like, to retrieve and use a login page of the third party system 108, may use a graphical user interface (GUI) such as a web browser to retrieve and use a login page of the third party system 108, or the like, in an automated fashion from a backend server of the backend system 110 or the like, with little or no interaction with the user.

Thus, the identity module 204 may verify the account status of a user using a different authentication channel than where the user entered his/her credentials, without requiring the user to input his/her credentials into the secure interface of the third party system 108. In other words, the identity module 204 attempts to log the user into the third party system 108 via a secure interface of the third party system 108 without displaying, graphically or otherwise, the secure interface to the user.

If the identity module 204 successfully logs into the secure interface of the third party system 108 using the received user credentials, the identity module 204, in a further embodiment, submits the unique token to a private input element located behind the secure interface of the third party system 108. The private input element, in certain embodiment, may be part of the security module 104, may be owned by and/or associated with the backend system 110, or the like. For example, the third party system 108 may comprise an embedded widget, page, iframe, code block, or other element from the backend system 110 or an associated entity (e.g., a third party system 108 of a bank or financial institution may embed a personal financial management or budgeting widget from a vendor associated with the backend system 110, in its online banking platform, to display budget visualizations, goals, or the like). The private input element may comprise an input element that is graphically hidden from a user accessing an associated page or view, but that is accessible to the identity module 204. For example, the private input element may comprise an input text box and/or button for a form on a web page, but instead of the input text box and/or button being visible to a user, the input text box and/or button is hidden so that it is not visible and/or noticeable on the web page (e.g., the input text box and/or button may be behind another element such as an image, may be the same color as the background, may be very small such as one or a few pixels, may not be displayed at all but may be present only in code of the web page, or the like).

As described in more detail below, the private input element may be identified by an indicator or a beacon such as a flag, a specific string of characters, a specific tag, a comment, or the like within the code of the web page. For example, the private input element may be identified by the tag "<input_token>" or the like, which may indicate that the input element associated with the "<input_token>" tag is the private input element where the identity module 204 should submit the unique token. In another example, the private input element may include a predefined area of a web page such that the identity module 204 "submits" the unique token when the identity module 204 "moves" a cursor to and/or clicks on that area of the web page (e.g., creates a cursor move event within the web page to the predefined area), which may be indicated by a flag or beacon within the code of the web page, or the like. In such an embodiment, submission of the unique token may include submitting the coordinates of the predefined area of the web page, or the like. In other embodiments, the identity module 204 may submit the unique token by providing a unique key combination, playing a unique sound, providing a unique geographical location (e.g., a spoofed longitude and a latitude or the like, in a remote location which is not likely to be associated with an actual user), providing unique sensor data (e.g., spoofed biometric data such as a fingerprint, heartbeat, or retina scan; spoofed accelerometer/gyroscope data; or the like), and/or providing another unique or unusual data pattern not likely to be provided by a user.

A match module 206, in one embodiment, receives the unique token from the private input element, as submitted by the identity module 204 (e.g., the private input element may be configured to submit the received unique token or an identifier thereof to the match module 206). The match module 206, in certain embodiments, may also receive a user identifier (e.g., a user key) associated with the unknown user from the third party system 108. In some embodiments, the user identifier is different than the unique token and/or the user credentials (e.g., may be generated and/or provided by the third party system 108). The user identifier may comprise an identifier that uniquely identifies a user, and/or the user's data, within the third party system 108. For example, the user identifier may be a unique number that is assigned to the user's data such as account information, preferences, settings, reports, budgets, and/or the like. The user identifier may be used, in some embodiments, as a key or index into a database or other data store that comprises the user's data. For example, in embodiments where the third party system 108 embeds data from the backend system 110, the third party system 108 may provide a unique user key for a user to the backend system 110 in response to valid user credentials being provided to the secure interface of the third party system, in order to retrieve and display the embedded data associated with the user.

In one embodiment, the match module 206 receives the user identifier from the third party system 108 where the identity module 204 submitted the user credentials. For example, if the identity module 204 submits the user credentials on a login page for a university to verify a student's identity, the match module 206 may receive a user identifier associated with the student from the university's authorization system if the identity module 204 was able to successfully login using the student's credentials. In some embodiments, the identity module 204 receives the user identifier and sends it to the match module 206.

In certain embodiments, the user identifier associated with the unknown user is generated and used by a single sign-on service associated with the third party system 108 to identify a user of the third party system 108. For example, the website behind the secure interface may include a plurality of widgets, described below, that connect to one or more web servers (e.g., to one or more servers of the backend system 110). The web servers for different widgets may request user credentials to receive information for the widgets. Instead of requiring the user to sign into different widgets separately, a single sign-on system may be used to allow the user to log into the secure interface of the third party system 108 one time, which also logs the user into one or more web servers associated with an embedded widget or other embedded data (e.g., the backend system 110). Accordingly, instead of sending the user credentials to each web server for each widget, the single sign-on service may generate a user identifier or user key that may be used to identify the user at different locations, web servers, databases, or the like (e.g., the backend system 110).

The match module 206, in one embodiment, associates the received user credentials with the user identifier based on receiving the unique token from the private input element embedded behind the secure interface of the third party system 108 and matching the received unique token with a copy of the unique token previously generated for and associated with the received user credentials. In certain embodiments, the match module 206 compares the received unique token to records of tokens generated by the token module 202 to determine whether the received token is the same as one of the generated tokens (e.g., to determine which user credentials match the received user identifier). If the match module 206 determines that one of the generated unique tokens and the received unique token are the same, then the match module 206 may confirm that the unknown user who entered the user credentials is the user associated with the user identifier. In other words, if a generated unique token and a received unique token match or are the same, the match module 206 associates the received user identifier with the user credentials.

In one embodiment, the token module 202 may store the unique token with the user identifier for the user (e.g., the unique token may be globally unique and may continue to be associated with the user). For example, the token module 202 may generate the unique token by generating a hash value using the user's credentials so that the token module 202 may consistently generate the same hash value for the same credentials. In a further embodiment, the unique token may be a temporary and/or reusable token and the match module 206 may discard and/or reuse the unique token received from the private input element in response to associating the received user credentials with the user identifier.

The access module 208, in one embodiment, displays information associated with the user identifier to the unknown user in response to the match module 206 associating the received user credentials with the user identifier. The information may include user data such as settings, preferences, budgets, reports, transactions, logs, data previously provided by the user through the secure interface of the third party system 108 (e.g., through an embedded widget or other element), or the like. In certain embodiments, the user information may be indexed, referenced, or otherwise accessible by the user identifier. Accordingly, after the match module 206 associates the user identifier with the user credentials, the access module 208 may retrieve the user's information from a data store and send and/or display the information to the information handling device 102 associated with the unknown user each time the user provides the user credentials.

For example, an unknown user may log into a mobile application associated with an organization that hosts an email system where the user has an email account. The user may provide his/her credentials, a username and password, for instance, to the mobile application to log in to his email account. The provided username and password may be the same credentials the user uses to log into a secure web interface to the email system. In the online or web email system, after the user is authenticated by providing his/her username and password to the secure web interface, the email system may look up the user's user identifier, which is subsequently used to find the user's information instead of sending the user's credentials. Once the match module 206 has associated the user identifier with the user's credentials, in certain embodiments, the association is stored in a non-volatile storage medium of the backend system 110 or the like, so that the matching process is not repeated the next time that the user provides the user's credentials.

Authenticating a user and providing the user access to the email system via the mobile application may not be possible in situations where the mobile application cannot determine the user identifier that is used to index the user's information due to inconsistent authentication protocols, different security infrastructures, lack of access to an API, or the like. Accordingly, the security module 104 may be utilized to overcome this obstacle. Continuing with the current example, the token module 202 may receive the username and password from the mobile application and generate a unique token. The identity module 204 may provide the username and password to the secure web interface to log into the email system. In response to successfully logging into the email system, the identity module 204 may submit the unique token to a private input element located behind the secure web interface (e.g., a hidden input element on a subsequent web page, such as an element of an embedded plugin or widget in a page of the third party system 108, an inbox page or the like in the email example).

The match module 206 may receive the unique token from the private input element and a user identifier associated with the username and password used to log into the email system. The match module 206 may associate the user identifier with the user credentials used to login to the email system from the mobile application in response to the received unique token and the generated unique token being the same. The access module 208 may present information associated with the user's email account on the mobile application in response to the match module 206 matching associating the user identifier with the user credentials.

Figure 3:
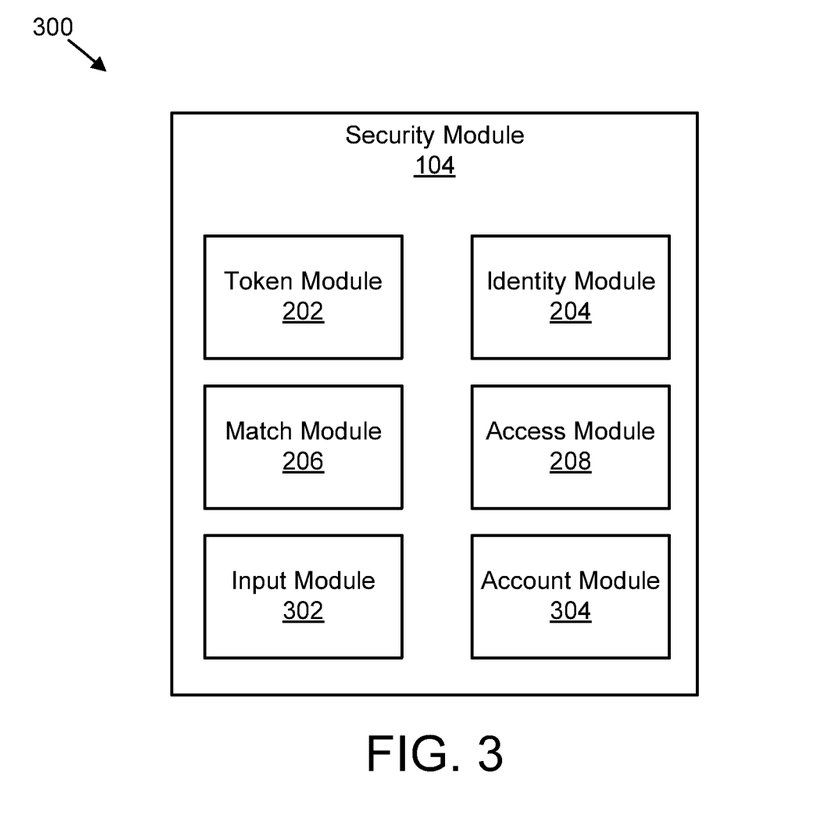
FIG. 3 is a schematic block diagram illustrating one embodiment of another module for user authentication in separate authentication channels.

FIG. 3 depicts one embodiment of another module 300 for user authentication in separate authentication channels. In one embodiment, the module 300 includes an embodiment of a security module 104. The security module 104, in various embodiments, includes one or more of a token module 202, an identity module 204, a match module 206, and an access module 208, which may be substantially similar to the token module 202, the identity module 204, the match module 206, and/or the access module 208 described above with reference to FIG. 2. In a further embodiment, the security module 104 includes one or more of an input module 302 and an account module 304, which are described in more detail below.

In certain embodiments, the input module 302 scrapes, checks, or otherwise searches a website or web page (e.g., the source code of the website or web page) of the secure interface of a third party system 108 to locate one or more input elements into which the identity module 202 submits the received credentials to log into the secure interface of the third party system 108. For example, the input module 302 may scrape (e.g., search within the code of a website) a login page of a website to find input elements that correspond to a username input element and a password input element. The website may be written using one of, or a combination of, various programming languages, such as JavaScript, HTML, PHP, Perl, or the like. The input module 302 may parse the source code of the website to determine where various input elements are located on the website, such as input elements for the user credentials.

The input module 302, in a further embodiment, enters the credentials into the input elements and triggers authorization of the user based on the credentials. For example, the input module 302 may search for an action element within the web page, such as a button or link, that sends the credentials to an authorization back-end service that verifies whether the user has an existing account or not.

In a further embodiment, the input module 302 further searches a website behind the secure interface of a third party system 108 to locate the private input element into which the identity module 204 submits the unique token. In certain embodiments, the input module 302 searches the website behind the secure interface of the third party system 108 for a private input element in response to the identity module 204 successfully logging into the secure interface of the third party system 108 using the received user credentials. In some embodiments, the private input element is not visible or accessible in a graphical display of the website. Thus, even if users view the website within a web browser, for example, the users may not be able to see or access the private input element.

For example, if the identity module 204 successfully logs into the third party system 108 with the received user credentials, the input module 302 may search the source code of the website or web page loaded after the user has been authenticated for a flag, beacon, or other indicator for the private input element. For example, the input module 302 may be configured to search for an "<input_token>" tag within the markup language of the website, which indicates the private input element for the unique token. In this manner, the private input element comprises a hidden flag, beacon, indictor, or the like that is accessible to the input module 302 within the source code of the website, but is graphically hidden and inaccessible in a graphical display of the website.

In a further embodiment, the hidden flag, beacon, indicator, or the like, comprises a portion of a widget displayed on the website behind the secure interface of the third party system 108. In certain embodiments, a widget, also known as a web widget or a software widget, is an application with limited functionality that can be installed and executed within a web page. For example, a web page may include a weather widget that connects to a weather service or website and displays weather information, a news widget that connects to a news service or website and displays news, and so on. Thus, the input module 302 may search one or more widgets installed on the website behind the secure interface of the third party system 108 for a private input element where the identity module 204 can submit the unique token.

In one embodiment, the account module 304 is configured to access, create, modify, delete, or the like accounts, records, or the like, for a user. In one embodiment, the account module 304 creates a new record for the unknown user in response to the access module 208 failing to find information associated with the user, and associates the received user identifier with the new record. For example, the user may have registered or otherwise created a new account in the third party system 108, but may not have created any data, such as reports, preferences, settings, budgets, or the like. In such an embodiment, the account module 304 may create a new record comprising default data, predefined data, or the like, which the access module 208 may display on the user's information handling device 102.

In a further embodiment, the account module 304 may modify the user's records in response to a user editing their data. For example, if the user changed his/her preferences or created a new custom report, the account module 304 may update the user's information to reflect the changes. Similarly, the account module 304 may delete a user's records or create new user records in response to the user, or the third party system 108, issuing a delete or create command.

Figure 4:
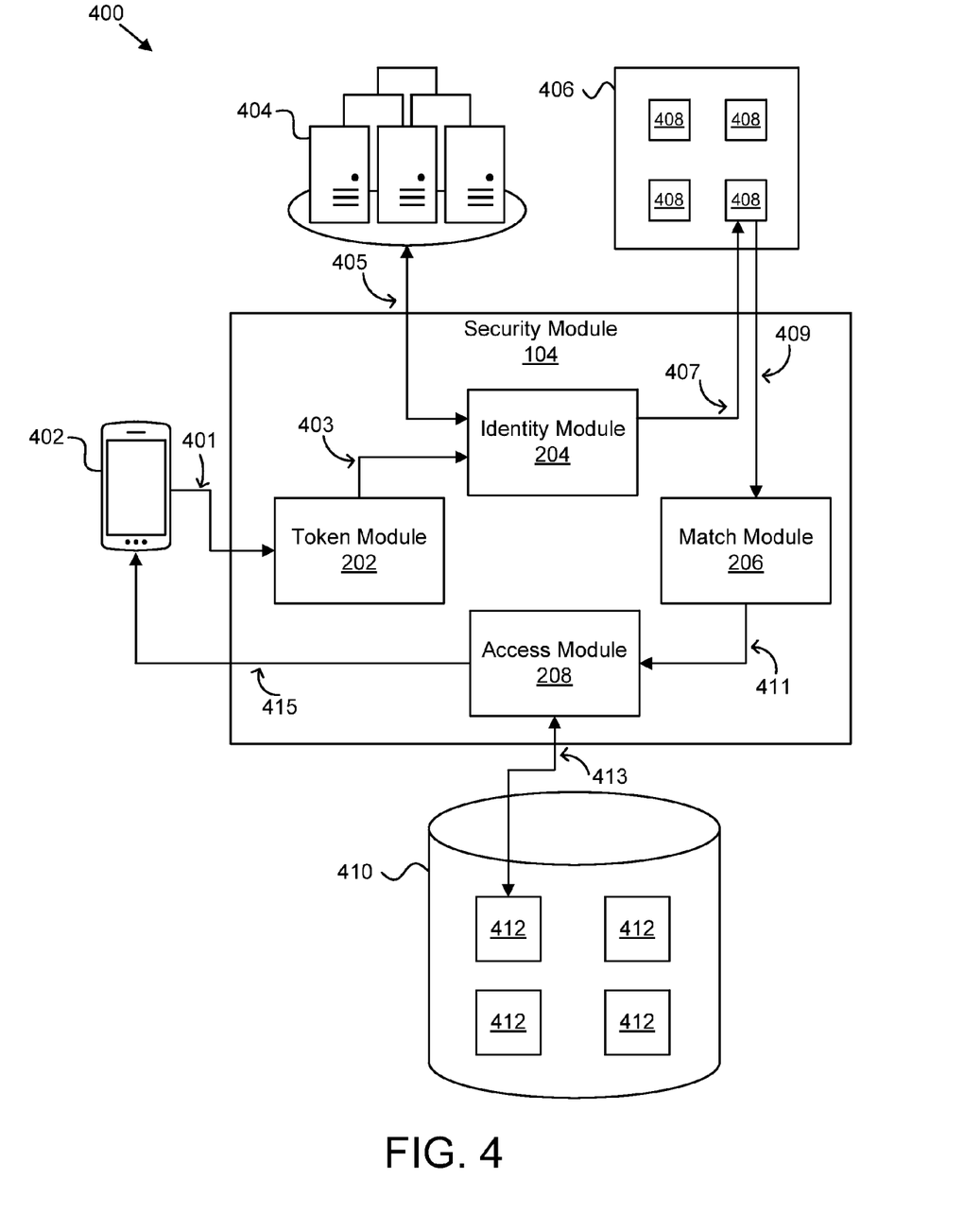
FIG. 4 is a schematic block diagram illustrating one embodiment of a system for user authentication in separate authentication channels.

FIG. 4 depicts one embodiment of a system 400 for user authentication in separate authentication channels. In the depicted embodiment, the system 400 includes a smart phone 402 which may be running an instance of a mobile application associated with a third party system 404 hosted by a bank. A user may enter his/her credentials, for example, a username and password, on the smart phone 402 to access their account information from the bank 404, such as preferences, settings, reports, budgets, or the like.

The token module 202 may receive the username and password (line 401) from the mobile application and generate a unique token. The identity module 204 may receive the username and password and the unique token (line 403), and attempt to log into an authentication website for the bank 404 (line 405), without graphically presenting the authentication website to a user and/or, in certain embodiments, at all. In response to the identity module 204 determining that the login was successful (line 405), the identity module 204 may determine (line 407) a private input element for the unique token on a website 406 that sits behind the authentication website for the bank 404. In certain embodiments, the website 406 may include one or more widgets 408, or like elements, that contain a private input element for the unique token. As explained above, the private input element, in one embodiment, is an element of the website 406 or widget 408 that the identity module 204 can access, but is not visible or accessible to any users.

The match module 206, in one embodiment, receives the unique token (line 409) in response to the identity module 204 submitting the unique token (line 407) to the private input element. The match module 206 may also receive a user identifier (line 409) from the website 406 or widget 408. The match module 206 may match the received unique token from the website 406 or widget 408 (line 409) to the unique token that the token module 202 generated. If the match module 206 determines that the received unique token and the generated unique token are the same, the match module 206 associates the received user identifier with the credentials that the user (line 411), and the access module 208 may retrieve (line 413) the user's information 412 from a database 410, or similar data store. The access module 208, in one embodiment, sends and/or displays (line 415) the user's information on the smart phone. In the embodiment illustrated in FIG. 4, the operations performed by the security module 104 to authenticate and retrieve the user's information happens in real-time (e.g., within seconds, milliseconds, microseconds, or the like), without presenting any web pages of the third party system 108 to the user and/or without requiring the user to provide any information in addition to their user credentials.

Figure 5:
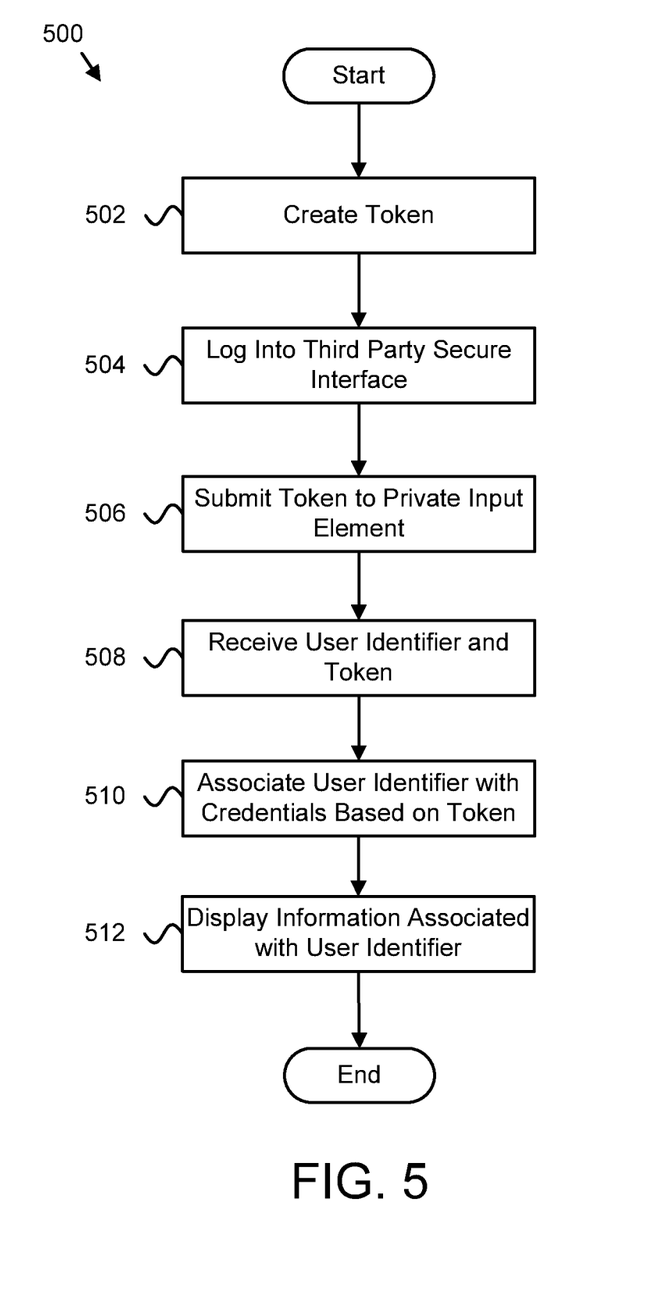
FIG. 5 is a schematic flow chart diagram illustrating one embodiment of a method for user authentication in separate authentication channels.

FIG. 5 depicts one embodiment of a method 500 for user authentication in separate authentication channels. In one embodiment, the method 500 begins, and the token module 202 creates 502 a unique token in response to receiving user credentials from an unknown user for a secure interface of a third party system 108. The user credentials may include a username/password combination, a personal identification number, biometric data, device data, and/or the like.

In certain embodiments, the token module 202 creates 502 a unique token using a random number/string generator where the user credentials are used to seed the random number/string generator. In some embodiments, the token module 202 creates 502 a unique token by generating a hash value using a hash function, or the like. In various embodiments, the token module 202 creates 502 a unique token embodied as a random string of characters of various lengths, an image, a sound, an event trigger or a series of event triggers (e.g., a mouse click event, a key press event, a hover event, or the like), a code snippet, a script (e.g., a set of JavaScript instructions), selecting a predefined input element of a web page (e.g., a button or link), selecting or hovering over a predefined section of a web page (e.g., predefined areas, elements, or pixels) with a cursor, or the like.

In a further embodiment, the identity module 204 logs 504 into the secure interface of the third party system 108 using the received user credentials. For example, the identity module 204 may log 504 into an authentication website for a bank, a university, an online store, an email system, or the like, by inputting the user credentials into one or more input elements on the authentication website without graphically displaying the authentication website to the user.

In certain embodiments, the identity module 204 submits 506 the unique token to a private input element located behind the secure interface of the third party system 108 in response to successfully logging into the secure interface of the third party system 108 using the received user credentials. The identity module 204 may submit 506 the unique token to the private input element without graphically displaying the private input element to the user. For example, the identity module 204 and/or the input module 302 may locate the private input element by parsing the source code for the website or widget where the private input element is located for a particular flag, beacon, or other indicator.

In various embodiments, the match module 206 receives 508 the unique token from the private input element and receives 508 a user identifier associated with the unknown user from the third party system 108. In some embodiments, the match module 206 associates 510 the received user credentials with the user identifier based on the unique token. For example, the match module 206 may associate 510 the received user credentials with the user identifier in response to the received unique token matching the generated unique token. In a further embodiment, the access module 208 displays 512 information associated with the user identifier to the unknown user in response to the match module 206 associating the received user credentials with the user identifier, and the method 500 ends.

Figure 6:
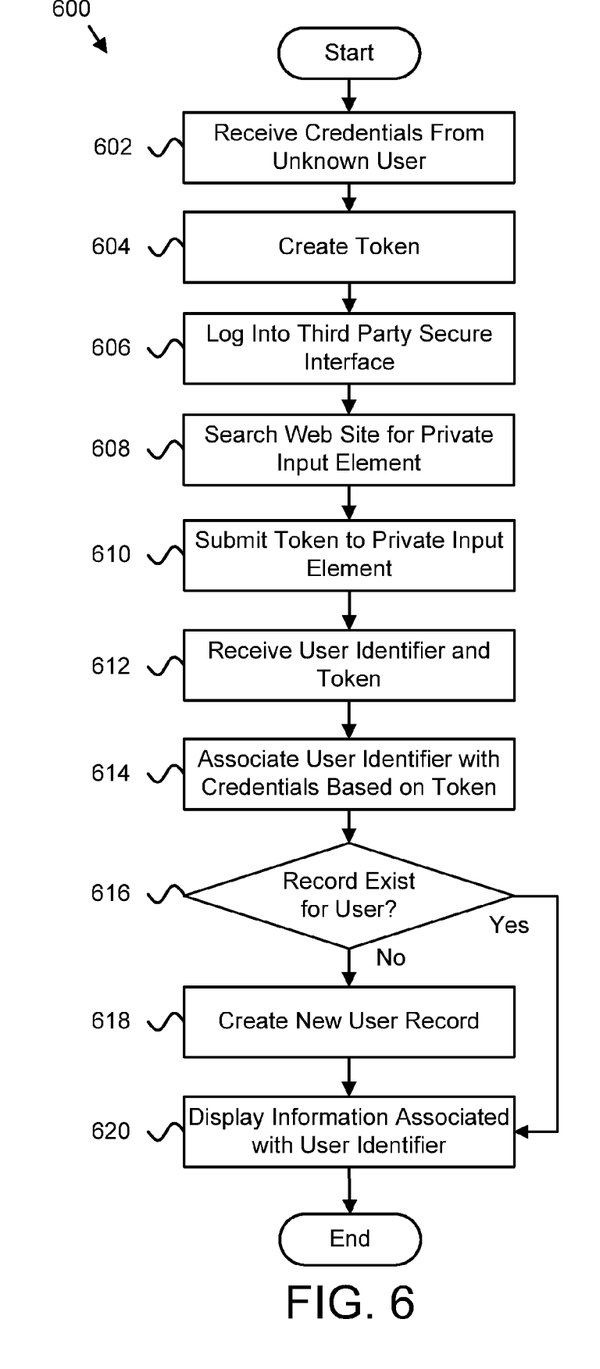
FIG. 6 is a schematic flow chart diagram illustrating one embodiment of another method for user authentication in separate authentication channels.

FIG. 6 depicts one embodiment of another method 600 for user authentication in separate authentication channels. In one embodiment, the method 600 begins and the token module 202 and/or the identity module 204 receives 602 the user credentials from an unknown user. The token module 202, in one embodiment, creates 604 a unique token in response to receiving the user credentials from an unknown user for a secure interface of a third party system 108. In a further embodiment, the identity module 204 logs 606 into the secure interface of the third party system 108 using the received user credentials. In certain embodiments, the input module 302 searches a web site of the secure interface of the third party system 108 to locate the one or more input elements into which the identity module 204 submits the received credentials to log into the secure interface of the third party system 108.

In a further embodiment, the input module 302 searches 608 a web site behind the secure interface of the third party system 108 to locate the private input element into which the identity module 204 submits the unique token in response to the identity module 204 successfully logging into the secure interface of the third party system 108 using the received user credentials. In one embodiment, the identity module 204 submits 610 the unique token to a private input element located behind the secure interface of the third party system 108 in response to successfully logging into the secure interface of the third party system 108 using the received user credentials.

In some embodiments, the match module 206 receives 612 the unique token from the private input element and receives 612 a user identifier associated with the unknown user from the third party system 108. In a further embodiment, the match module 206 associates 614 the received user credentials with the user identifier based on the unique token. In one embodiment, the account module 304 determines 616 whether a record exists for the user based on the provided user identifier. If the account module 304 determines 616 that a record for the user does exist, the access module 208 displays 620 the user's information within the record, and the method 600 ends. If the account module 304 determines 616 that a record for the user does not exist, the account module 304 creates 618 a new record for the user, the access module 208 displays 620 the user's information within the record, and the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory medium, storing instructions that, when executed by a processor, cause the processor to perform the steps of:
   receiving user credentials from a user for a secure interface of a third party system;
   creating a unique token comprising a unique value generated for the received user credentials;
   accessing computer readable code of the secure interface of the third party system;
   locating one or more user credential input elements of the secure interface in the computer readable code of the secure interface of the third party system;
   logging into the secure interface of the third party system by submitting the received user credentials into the one or more located user credential input elements;
   accessing computer readable code of a web site located behind the secure interface of the third party system;
   locating one or more tags of a private input element in the computer readable code of the web site located behind the secure interface of the third party system, the private input element being associated with a backend server separate from the third party system and embedded in the web site located behind the secure interface of the third party system;
   submitting the unique token to the private input element;
   receiving the unique token from the private input element;

receiving a user identifier associated with the user from the third party system;

associating the received user credentials with the user identifier based on the unique token; and displaying information associated with the user identifier to the user.

2. The non-transitory medium of claim 1, wherein the one or more tags of the private input element comprise a hidden flag in the computer readable code of the web site located behind the secure interface of the third party system, the hidden flag identifying the private input element and being accessible within the computer readable code, but graphically hidden and inaccessible in a graphical display of the web site located behind the secure interface of the third party system.

3. The non-transitory medium of claim 1, wherein the one or more tags are part of a graphical widget that is visible in a graphical display of the web site located behind the secure interface of the third party system, the graphical widget presenting information from one or more different web sites.

4. The non-transitory medium of claim 1, wherein the steps further comprise:

determining that the unique token received from the private input element matches the created unique token; and associating the received user credentials with the user identifier.

5. The non-transitory medium of claim 1, wherein the steps further comprise:

storing the unique token with the information associated with the user;

determining that the unique token received from the private input element matches the stored unique token; and associating the received user credentials with the user identifier.

6. The non-transitory medium of claim 1, wherein the steps further comprise discarding the unique token received from the private input element after determining that the unique token received from the private input element matches the created unique token.

7. The non-transitory medium of claim 1, wherein logging into the secure interface of the third party system comprises logging into a single sign-on service associated with both the third party system and the private input element embedded in the web site located behind the secure interface of the third party system.

8. The non-transitory medium of claim 1, wherein the steps further comprise:

failing to find existing information associated with the user identifier; and creating a new record for the user comprising the displayed information.

9. The non-transitory medium of claim 1, wherein the one or more credentials comprise one or more of a username/password combination, a personal identification number, biometric data, and device data.

10. An apparatus comprising:

a processor;

a non-transitory medium, storing instructions that, when executed by the processor, cause the processor to perform the steps of:

receiving user credentials from a user for a secure interface of a third party system;

creating a unique token, the unique token comprising a unique value generated for the received user credentials;

accessing computer readable code of the secure interface of the third party system;

locating one or more user credential input elements of the secure interface in the computer readable code of the secure interface of the third party system;

submitting the received user credentials into the one or more located user credential input elements;

accessing computer readable code of a web site located behind the secure interface of the third party system;

locating one or more tags of a private input element in the computer readable code of the web site located behind the secure interface of the third party system, the private input element being associated with a backend server separate from the third party system and embedded in the web site located behind the secure interface of the third party system;

submitting the unique token to the private input element;

receiving the unique token from the private input element;

receiving a user identifier associated with the user from the third party system;

associating the received user credentials with the user identifier based on the unique token; and displaying information associated with the user identifier to the user.

11. The apparatus of claim 10, wherein the one or more tags comprise a hidden flag in the computer readable code of the web site located behind the secure interface of the third party system, the hidden flag identifying the private input element and being accessible within the computer readable code, but graphically hidden and inaccessible in a graphical display of the web site located behind the secure interface of the third party system.

12. The apparatus of claim 10, wherein the steps further comprise:

determining that the unique token received from the private input element matches the created unique token; and associating the received user credentials with the user identifier.

13. The apparatus of claim 10, wherein the steps further comprise:

failing to find existing information associated with the user identifier; and creating a new record for the user comprising the displayed information.

14. The apparatus of claim 10, wherein the one or more credentials comprise one or more of a username/password combination, a personal identification number, biometric data, and device data.

15. A method comprising:

receiving, by a user device, user credentials from a user for a secure interface of a third party system;

creating, by one of the user device and a backend server, a unique token, the unique token comprising a unique value generated based on the received user credentials;

accessing, by one of the user device and the backend server, computer readable code of the secure interface of the third party system;

locating, by one of the user device and the backend server, one or more user credential input elements of the secure interface in the computer readable code of the secure interface of the third party system;

logging into, by one of the user device and the backend server, the secure interface of the third party system by submitting the received user credentials into the one or more located user credential input elements;

accessing, by one of the user device and the backend server, computer readable code of a web site located behind the secure interface of the third party system;

locating, by one of the user device and the backend server, one or more tags of a private input element in the computer readable code of the web site located behind the secure interface of the third party system, the private input element being associated with the backend server and embedded in the web site located behind the secure interface of the third party system;

submitting, by one of the user device and the backend server, the unique token to the private input element;

receiving, by the backend server, the unique token from the private input element;

receiving, by the backend server, a user identifier for the user from the third party system;

associating, by one of the user device and the backend server, the received user credentials with the user identifier based on the unique token; and displaying, by the user device, information associated with the user identifier to the user.

16. The method of claim 15, further comprising:

determining, by one of the user device and the backend server, that the unique token received from the private input element matches the created unique token; and associating the received user credentials with the received user identifier.

17. The method of claim 15, further comprising:

storing, by one of the user device and the backend server, the unique token with the information associated with the user;

determining, by one of the user device and the backend server, that the unique token received from the private input element matches the stored unique token; and associating, by one of the user device and the backend server, the received user credentials with the received user identifier.

18. The method of claim 15, further comprising discarding, by one of the user device and the backend server, the unique token received from the private input element after determining that the unique token received from the private input element matches the created unique token.

19. The method of claim 15, wherein logging into the secure interface of the third party system comprises logging into a single sign-on service associated with both the third party system and the private input element embedded in the web site located behind the secure interface of the third party system.

20. The method of claim 15, further comprising:

failing, by one of the user device and the backend server, to find existing information associated with the user identifier; and creating, by one of the user device and the backend server, a new record for the user comprising the displayed information.

* * * * *